(12) United States Patent
Emmons, Jr. et al.

(10) Patent No.: US 6,684,056 B1
(45) Date of Patent: Jan. 27, 2004

(54) SYSTEM FOR PROVIDING OPTIMAL SATELLITE COMMUNICATION VIA A MEO/LEO SATELLITE CONSTELLATION

(75) Inventors: Thomas Peter Emmons, Jr., Mesa, AZ (US); Shawn W. Hogberg, Chandler, AZ (US); Cynthia C. Matthews, Phoenix, AZ (US); Michael D. Ince, Chandler, AZ (US); Susan L. Harris, Mesa, AZ (US); Robert A. Peters, Silver Spring, MD (US); James W. Startup, Tempe, AZ (US); Jonathan H. Gross, Gilbert, AZ (US); John R. Erlick, Scottsdale, AZ (US); Allen H. 'Skip' Nelson, Phoenix, AZ (US); Craig L. Fullerton, Chandler, AZ (US); Jim E. Helm, Gilbert, AZ (US); John G. Lambrou, Scottsdale, AZ (US); David L. Krueger, Mesa, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/546,265

(22) Filed: Apr. 10, 2000

(51) Int. Cl.[7] .............................................. H04B 7/185
(52) U.S. Cl. ...................... 455/12.1; 455/13.1; 455/16; 455/427; 455/428; 455/426; 455/430; 455/3.05; 455/517; 455/450; 704/221

(58) Field of Search ............................... 455/12.1, 13.1, 455/16, 427, 428, 3.05, 426, 517, 450, 430, 526; 704/221

(56) References Cited

U.S. PATENT DOCUMENTS

| | | | | |
|---|---|---|---|---|
| 5,812,968 A | * | 9/1998 | Hassan et al. | 704/221 |
| 5,887,257 A | * | 3/1999 | Olds | 455/12.1 |
| 5,896,558 A | * | 4/1999 | Wiedeman | 455/12.1 |
| 6,078,810 A | * | 6/2000 | Olds et al. | 455/12.1 |

* cited by examiner

Primary Examiner—Sinh Tran
Assistant Examiner—David Nguyen
(74) Attorney, Agent, or Firm—Bradley J. Borsch

(57) ABSTRACT

A method of increasing satellite communication quality by using a MEO satellite constellation (12) and a LEO satellite constellation (14) in combination with a decision algorithm which selects the appropriate constellation to route a communication signal through. The decision algorithm can be embodied in three ways: gateway based (18), individual subscriber unit based (22) and satellite based (12, 14). The MEO constellation (12) and LEO (14) constellation may be cross-linked, allowing for switching of service between satellites, as needed, during a communication session.

18 Claims, 5 Drawing Sheets

10

US 6,684,056 B1

SYSTEM FOR PROVIDING OPTIMAL SATELLITE COMMUNICATION VIA A MEO/LEO SATELLITE CONSTELLATION

BACKGROUND OF THE INVENTION

1. Technical Field

The present invention relates generally to satellite communications, and more particularly to a system and technique for combining MEO and LEO satellite constellations in a communication system for improved communications performance.

2. Discussion

Presently known satellite communication networks use either low-earth orbit (LEO), medium-earth orbit (MEO) or geosynchronous (GEO) satellite constellations to transfer voice, data or video signals from a source to a destination. Such satellite constellations have distinct advantages and disadvantages. For example, MEO orbits are optimized for multiple satellite diversity systems with low link margins. On the other hand, LEO satellites provide a higher link margin and support higher data rates into a given size subscriber unit because of their reduced path loss. However, a LEO based satellite communication system typically requires more satellites for a given coverage area. Accordingly, it is desirable to provide a satellite based communication system which utilizes LEO and MEO satellites for optimizing communication performance and services to the system subscribers. It is further desirable to provide a technique for deciding whether the LEO satellite or the MEO satellite is better for carrying the communication session with a particular subscriber.

BRIEF DESCRIPTION OF THE DRAWINGS

The present invention will become fully understood from the detailed description and the accompanying drawings, wherein.

DETAILED DESCRIPTION OF THE PREFERRED EMBODIMENTS

The method and apparatus of the present invention improves satellite communications quality by providing a unique satellite coverage scheme. The preferred embodiment achieves this by combining a MEO satellite constellation with an additional LEO satellite overlay constellation. The MEO satellites provide complete earth coverage including special types of coverage, such as coverage of all exterior sides of a building. The MEO satellites also provide sufficient diversity such that there is always a direct line-of-site link to every side of a building. At minimal cost, the MEO satellites can also provide polar coverage.

The LEO overlay constellation provides higher link margins and/or higher data rates over a more limited coverage region. The combination of the MEO and LEO satellite constellations provides for complete coverage over the desired region and enhanced coverage over smaller regions. As part of the present invention, a decision algorithm must be utilized for directing which satellite constellation (MEO or LEO) will be used for the communication session between a satellite and an individual subscriber unit (ISU). This decision may be implemented in three ways.

First, the uplink signal quality, once quantified, can be transmitted to the gateway or directly measured at the gateway. The gateway will monitor the availability of resources for both satellite constellations (MEO and LEO) and the requested services, to decide how to route the communication signals. A clear line-of-site communication would typically default to the MEO constellation, while in vehicle service or high data rate services would typically default to the LEO constellation.

A second option is to have the individual subscriber unit (ISU) decide which constellation (MEO or LEO) to request service from. Since the ISU can simultaneously receive communication signals from both constellations, the ISU has the knowledge to decide which constellation can provide the best service and address or communicate with only the appropriate constellation. Additionally, preference bits may be added to the broadcast bursts to force acquisitions to the other constellation during periods where one constellation is over utilized and the other constellation has excess capacity.

The third option for deciding which constellation to route the communication session through is implemented by having the satellites themselves perform this decision function. This would happen in a similar manner as the gateway option, however, the satellites are crosslinked which allows the constellations to communicate with each other. Using this option, the satellites each measure the uplink acquisition burst from the subscriber unit. Using this measurement, the MEO and LEO satellites arbitrate between each other and decide which constellation is preferred for providing optimized communication performance.

Figure 1:
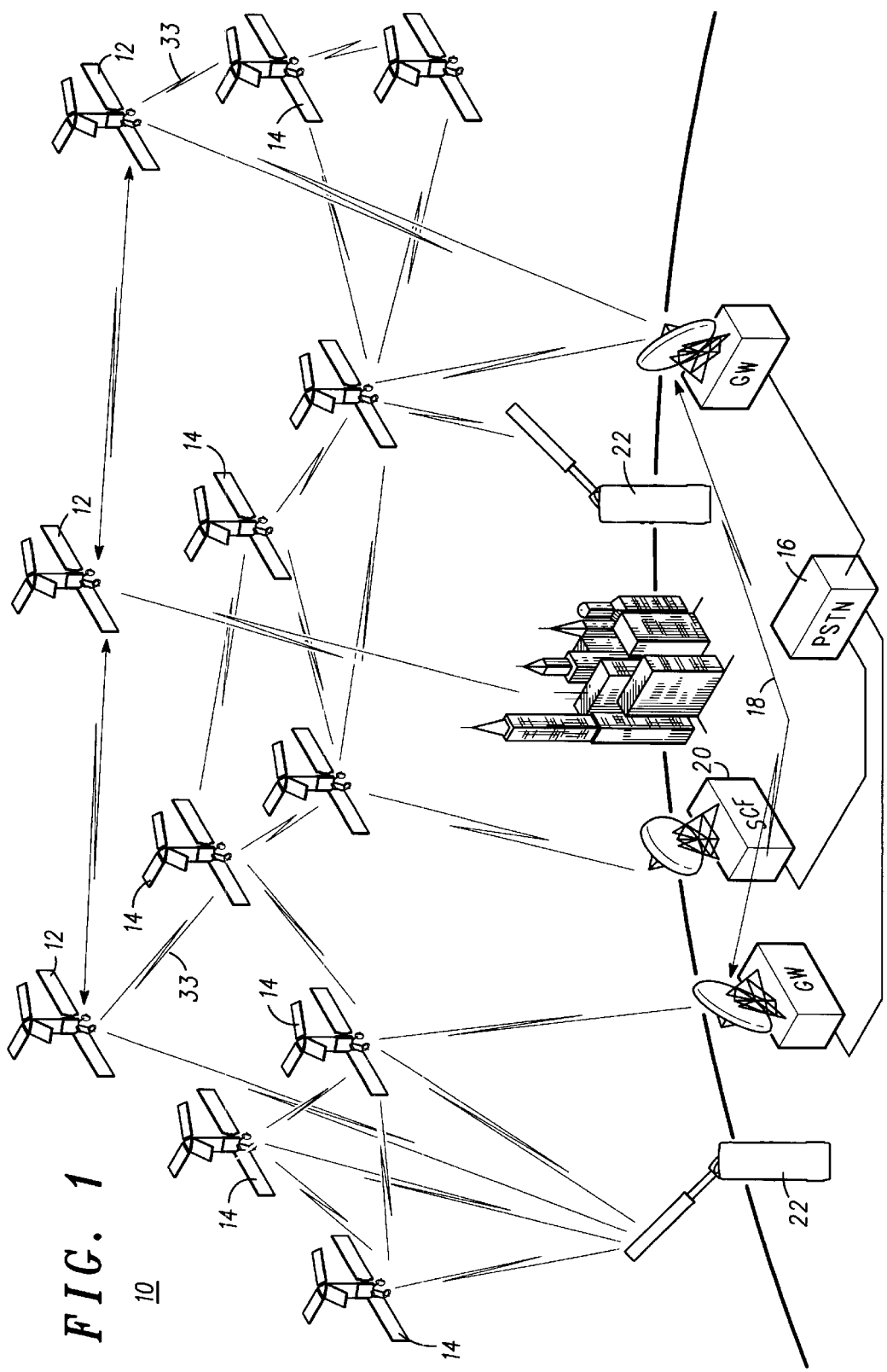
FIG. 1 is a schematic diagram showing a combined MEO/LEO satellite communication system with appropriate terrestrial based communication equipment.

FIG. 1 shows satellite communications system 10 associated with the preferred embodiment of the present invention. Communication system 10 comprises a constellation of MEO satellites 12 capable of communicating with substantially all earth surfaces, with an overlay constellation of LEO satellites 14 which provide at least partial earth coverage below the MEO satellite constellation. The communication system 10 also includes various terrestrial based communication systems including: a public switch telephone network (PSTN) 16, communication gateways 18, a satellite control facility (SCF) 20, and at least one individual subscriber unit (ISU) 22. As shown, the MEO satellites 12 are capable of communicating with each other, as well as with the gateways 18, satellite control facility 20 and the individual subscriber units 22. Also shown is that the LEO satellites 14 communicate with each other, as well as with the gateways 18, the satellite control facility 20, and the individual subscriber units 22. Additionally, the MEO satellites 12 may be crosslinked and communicate with the LEO satellites 14.

Figure 2:
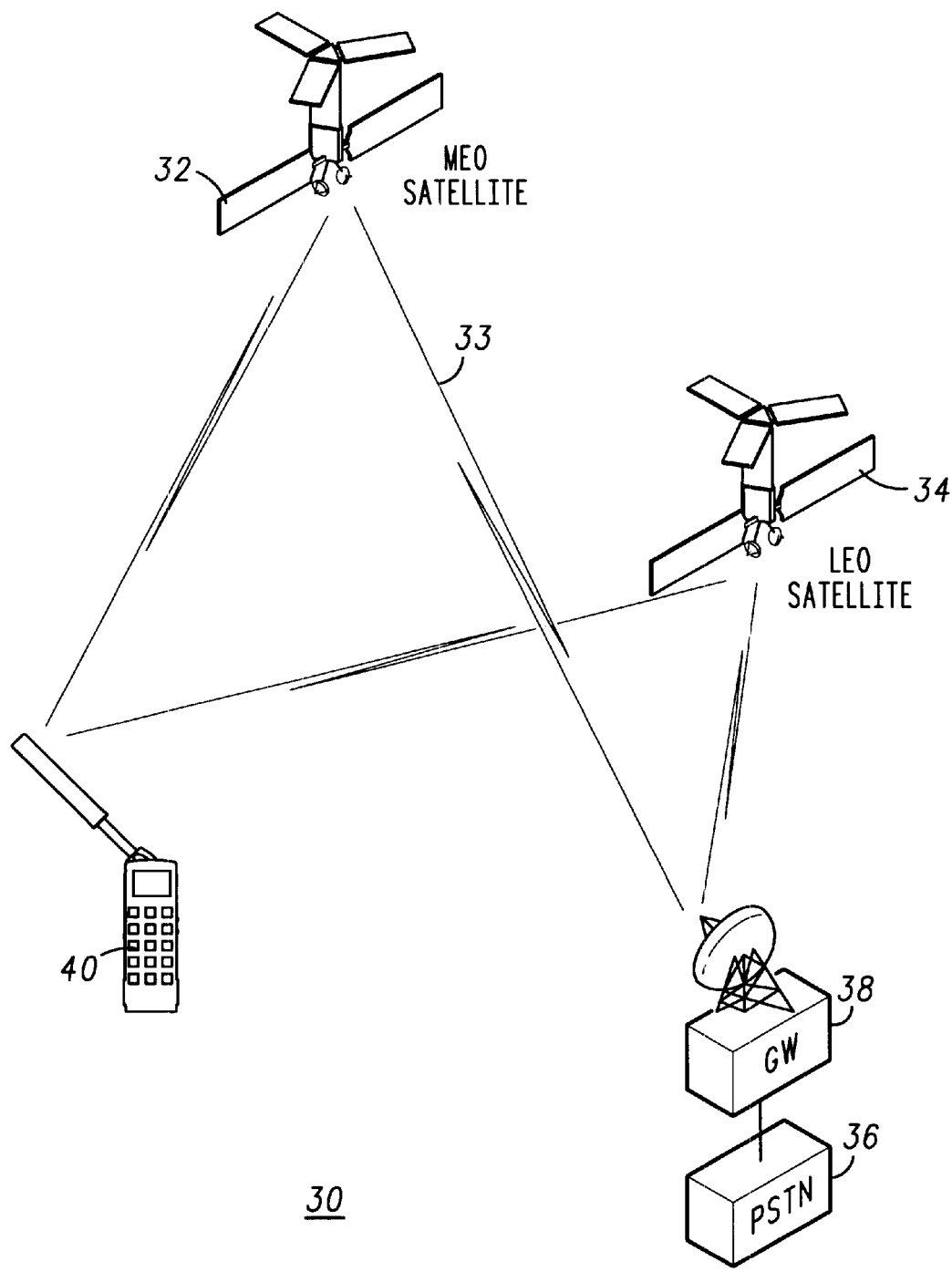
FIG. 2 is a schematic diagram detailing the interaction between the MEO and LEO satellites and the terrestrial based communication equipment.

FIG. 2 is an isolated view of the relevant portion of the overall communication system 10, shown generally at 30. As shown, the main features include a MEO satellite 32, a LEO satellite 34, a PSTN 36, a communication gateway 38, and at least one ISU 40. Using the illustration of FIG. 1, the communication system 10 generally operates as follows. An ISU 22 communicates with multiple satellites in either the LEO 14 or MEO 12 constellations. In turn, the constellations 12, 14 communicate with one or more gateways 18 which are linked via land line to a PSTN 16. As shown, the satellites 32, 34 are capable of communicating with each other via a satellite cross link 33. FIG. 2 illustrates a more detailed description of this process.

Figure 3:
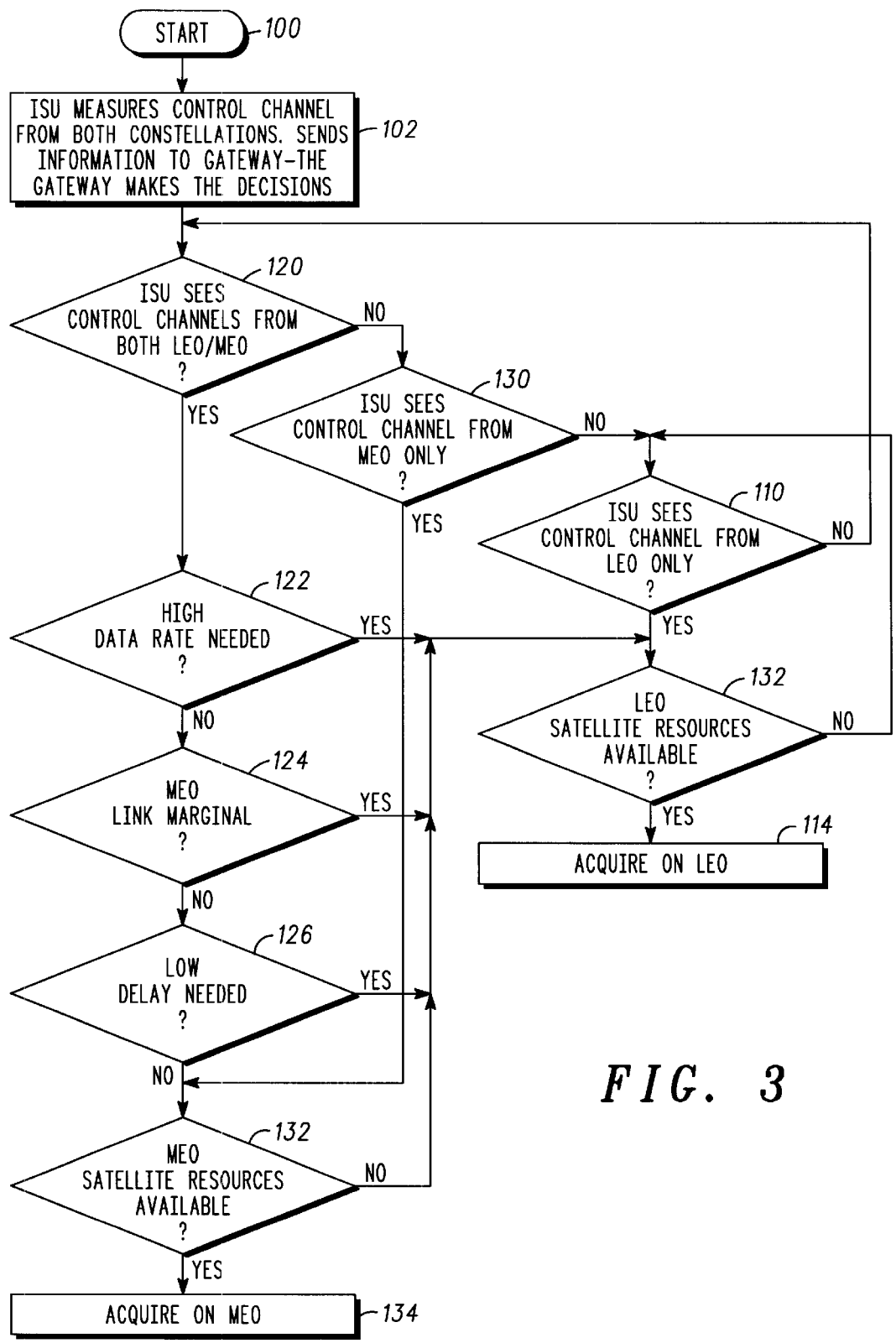
FIG. 3 is a flowchart describing the gateway based algorithm.

A particular feature of the present invention is the decision as to which satellite constellation to use; derived from a decision algorithm. As described above, there are three options for performing this decision. FIG. 3 shows a flowchart for the gateway based decision algorithm depicted generally at 100. At step 102, the ISU 22 measures the control channel from both the MEO and LEO satellite constellations and sends the control channel information to the communication gateway 18. The gateway 18 then uses this information in steps 110, 120 and 130. Beginning with step 120 the gateway 18 decides if the ISU 22 sees control channels from both the LEO constellation satellites 14 and the MEO constellation satellites 12. If the response is affirmative, the gateway 18 decides: whether a high data rate communication channel is needed, whether the MEO link is marginal, and whether a low delay is needed, in steps 122, 124 and 126, respectively. An affirmative answer to any of these inquiries loops the algorithm 100 to step 112, described in greater detail below. If all of the inquiries in steps 122, 124 and 126 result in a negative decision, then the algorithm is looped to step 132. At step 132, the gateway 18 decides whether MEO satellite resources are available. If the answer is affirmative, the algorithm loops to step 134, and the gateway 18 instructs the ISU 22 to acquire a MEO satellite 12 for communication services. Otherwise, the algorithm loops to step 112 and the ISU 22 is instructed by the gateway 18 to acquire a LEO satellite 14 for communication services. In the case where the ISU can only see the MEO control channel and not the LEO control channel, it will then exit step 112 and loop back to step 110. The ISU will then cycle through the whole process, either seeing the LEO control channel or wait until MEO resources are available.

If the response of step 120 is negative, the algorithm jumps to step 130 where the gateway 18 decides whether the ISU 22 sees a control channel only from the MEO constellation 12. An affirmative answer takes the algorithm to step 132 which decides if MEO satellite resources are available, as described above. A negative response at step 130 loops the algorithm to step 110. At step 110 the gateway 18 decides if the ISU 22 sees a control channel from only the LEO constellation 14. If the response is affirmative, the gateway 18 decides whether LEO satellite resources are available at step 112. If the step 112 response is negative then the algorithm loops back to step 110 and the ISU 22 continues to look for the control signal from a LEO satellite 14. If the step 112 response is positive, then the ISU 22 acquires a LEO satellite at step 114 and the ISU 22 can then communicate on the system.

Figure 4:
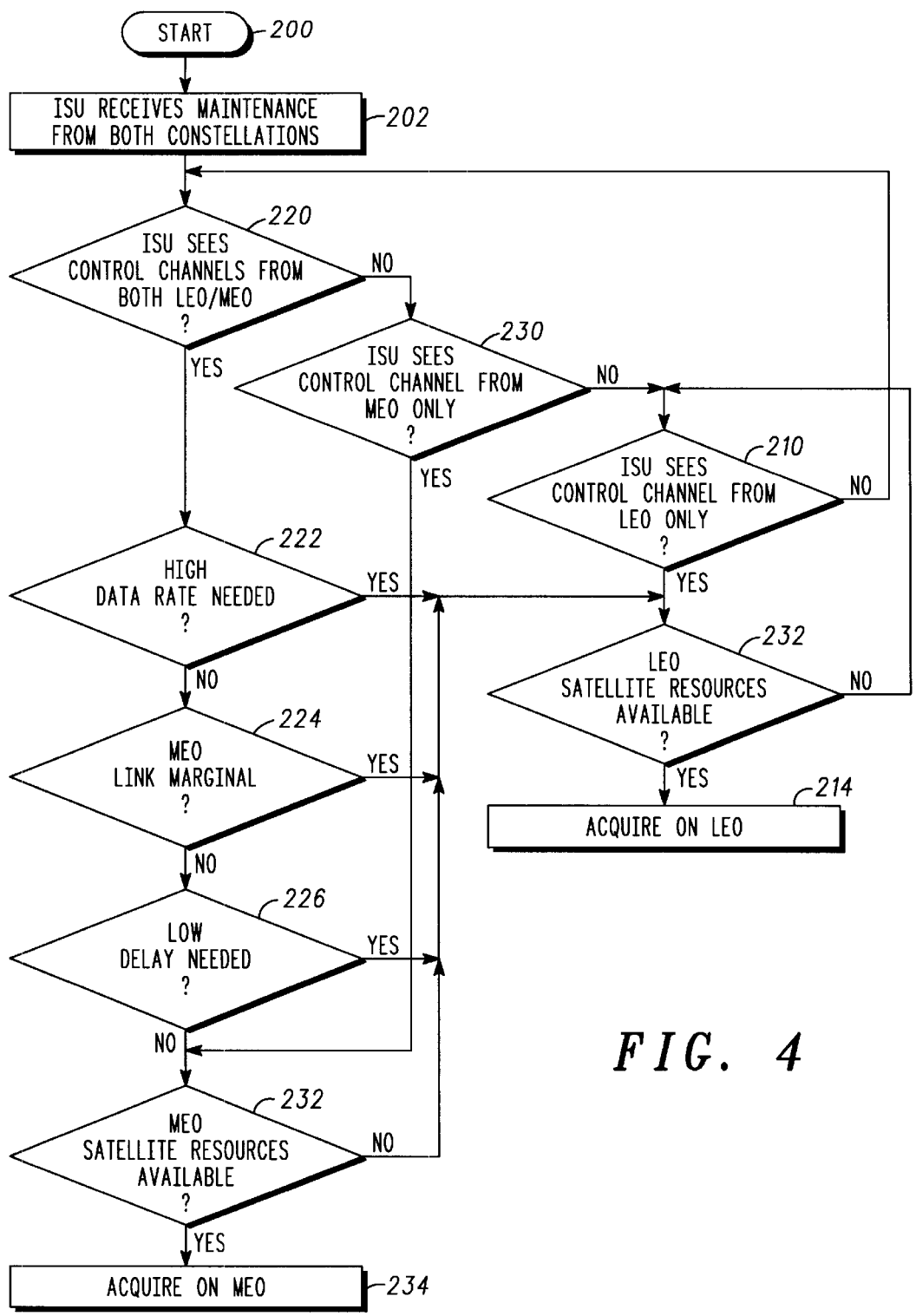
FIG. 4 is a flowchart describing the individual subscriber unit based algorithm.

Turning now to FIG. 4, a second option for the decision algorithm may be implemented by the ISU 22, and is generally shown at 200. At step 202, the ISU 22 receives broadcast bursts from both MEO and LEO constellations. The ISU 22 then uses this information in steps 210, 220 and 230. Beginning with step 220, the ISU 22 looks for control channels from both the LEO 14 and MEO 12 constellations. If the ISU 22 sees control channels from both, it decides: whether a high data rate is needed at step 222, whether the MEO link is marginal at step 224, and whether a low delay is needed at step 226. An affirmative answer to any of these inquiries loops the algorithm to step 212, described in greater detail below. If all of the inquiries in steps 222, 224 and 226 result in a negative response then the algorithm is looped to step 232. At step 232, the ISU 22 determines whether or not MEO satellite resources are available. This is done by looking at preference bits in the broadcast bursts. If the answer is affirmative, the algorithm loops to step 234, and the ISU 22 acquires an MEO satellite 12 for communication services. Otherwise, the algorithm loops to step 212 and the ISU 22 attempts to acquire a LEO satellite 14. In the case where the ISU can only see the MEO control channel and not the LEO control channel, it will then exit step 212 and loop back to step 210. The ISU will then cycle through the whole process, either seeing the LEO control channel or wait until MEO resources are available.

If the ISU 22 does not see a control channel from both constellations at step 220, then the algorithm jumps to step 230 where the ISU 22 determines whether it sees a control channel from only the MEO constellation 12. An affirmative answer loops the algorithm to step 232 in which the ISU 22 determines whether MEO satellite resources are available, as described above. A negative response at step 230 loops the algorithm to step 210. At step 210 the ISU 22 determines whether it sees a control channel only from the LEO constellation 14. If the response is affirmative, the ISU 22 determines whether LEO satellite resources are available at step 212. If the step 212 response determines LEO satellite resources are not available then the algorithm loops back to step 210. If the step 212 response determines that LEO satellite resources are available, then an LEO satellite is acquired by the ISU at step 214 for communication services.

Figure 5:
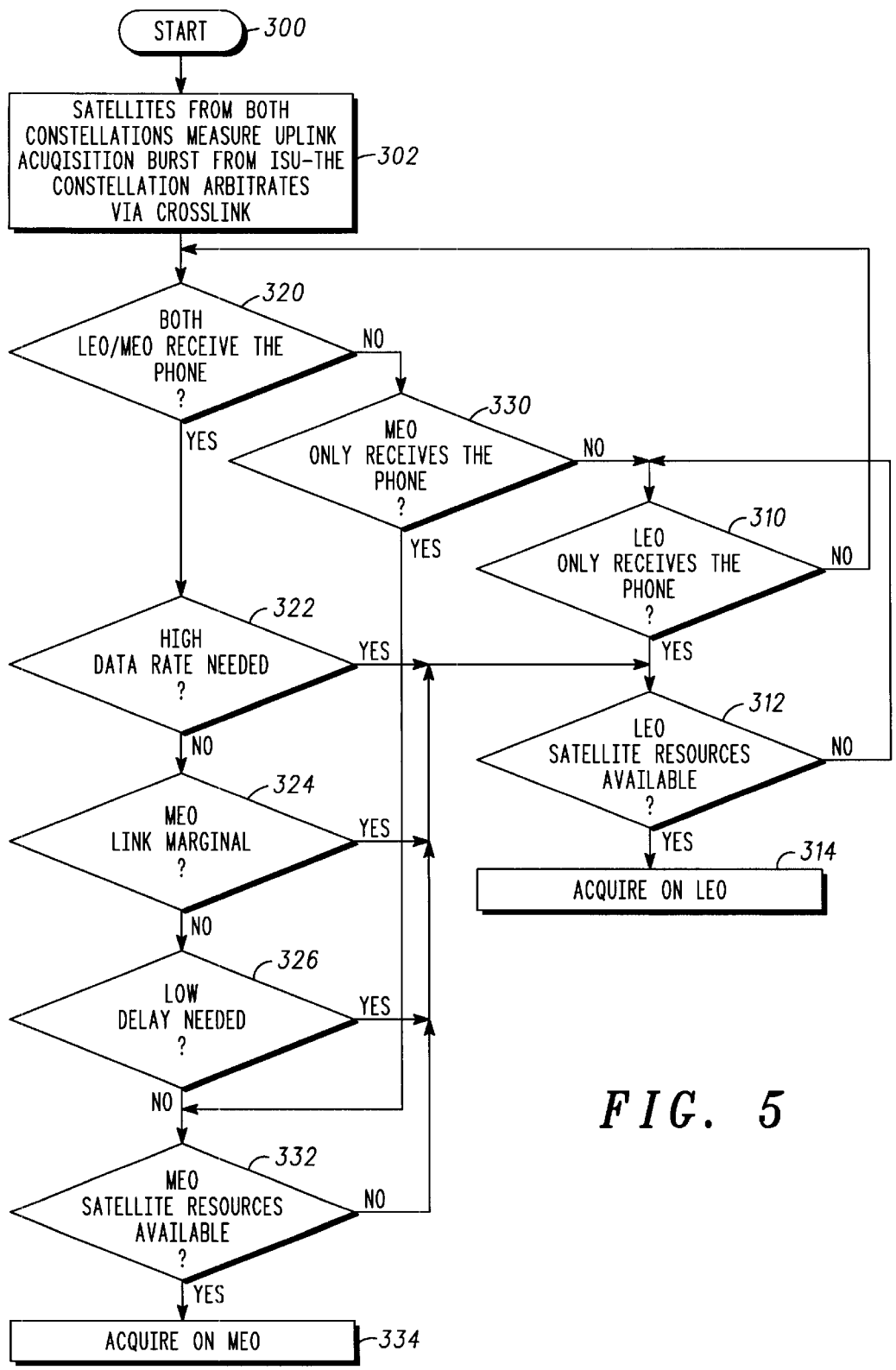
FIG. 5 is a flowchart describing the satellite based algorithm.

Referring to FIG. 5, a third option for the decision algorithm may be implemented by the satellites 12, 14. This algorithm is illustrated generally at 300. It must be noted, however, that using this algorithm preferably requires the MEO and LEO satellites 12, 14 to be linked. This linkage can be either direct through cross-links or indirect via connections through the ground based communication gateways 18. At step 302, the satellites 12, 14 from both constellations measure the uplink acquisition burst from the ISU 22. The satellites may perform arbitration through the linkage connection. The satellites then use the uplink information in steps 310, 320 and 330. Beginning with step 320, it is determined whether both the LEO and MEO satellites 14, 12 receive a link signal from the ISU 22. If the link signal from the ISU 22 is received by both satellites 12, 14, a processor in one of the satellites determines whether a high data rate is needed at step 322, whether the MEO link is marginal at step 324, and whether a low delay is needed at step 326. An affirmative answer to any of these inquiries loops the algorithm to step 312, described below. If all of the inquiries in steps 322, 324 and 326 result in a negative response then the algorithm is looped to step 332. At step 332, it is decided whether or not MEO satellite resources are available. If the answer is affirmative, the algorithm loops to step 334, which acquires an MEO satellite communication link for communication with the ISU 22. Otherwise, the algorithm loops to step 312 and the ISU 22 is instructed by the processing satellite to acquire a LEO satellite 14 for communication services. In the case where the ISU can only see the MEO control channel and not the LEO control channel, it will then exit step 312 and loop back to step 310. The ISU will then cycle through the whole process, either seeing the LEO control channel or wait until MEO resources are available.

If at step 320 only one constellation, not both, receives a signal from the ISU 22 the algorithm loops to step 330 where it is decided if the MEO constellation 12 is the only constellation to receive a signal. An affirmative answer loops the algorithm to step 332 which decides if MEO satellite resources are available, as described above. A negative response at step 330 loops the algorithm to step 310. At step 310 the satellites decide whether the LEO constellation 14 is the only constellation which receives a signal from the ISU 22. If the response is affirmative, the satellites decide whether LEO satellite resources are available at step 312. If the step 312 response is negative then the algorithm loops back to step 310. If the step 312 response is positive, then an LEO satellite is acquired by the ISU 22 at step 314 for communication services.

Any of the three options described above can be used to perform the decision as to which satellite constellation 12, 14 to engage. It should be noted that the ISU 22 will be in communication with multiple satellites, in the same constellation, throughout the duration of service. It should also be noted that the MEO satellite 12 and LEO satellite 14 constellations are preferably linked throughout the duration of the service. This allows the constellation performing the communication with the ISU 22 to switch the communication link to the other constellation when required. For example, if a subscriber 22 is outside of a building, communicating via a communication handset, a MEO satellite 12 will generally provide adequate communication service. However, during that same communication, if the subscriber chooses to walk into a building with the handset, the communication quality would be improved by simultaneously switching to a LEO satellite 14 due to the higher link margin provided by the LEO satellite.

Another benefit from the embodiment of this invention is accurate, timely geolocation of the communication handset. Referring to FIG. 2 for discussion, ISU 40 communicates simultaneously with MEO Satellite 32 and LEO Satellite 34. One skilled in the art will recognize that it is standard practice to go through a setup period where the system goes through acquisition, access, registration (if required) and then call establishment. During the access process, in a typical system, the location of the ISU is determined. Typically, it takes from 30 seconds to a few minutes to develop a location for the ISU with an accuracy center error of probability in the range of 10 to 15 kilometers. The time it takes to develop a solution and the solution accuracy are dependent on the geometric configuration between the ISU and the Satellite. In this embodiment, a geolocation accuracy of tens of meters can be accomplished in less than 5 seconds. Since the characteristics of the waveform and the transmit/receive frequencies between the ISU 40 and LEO Satellite 34 and MEO Satellite 32 are known, the time difference of arrival (TDOA) and frequency difference of arrival (FDOA) can be quickly determined. Knowing the locations of MEO Satellite 32 and LEO Satellite 34 allows a simple calculation which immediately determines the location of ISU 40. The circle error of probability is low because the time and frequency determinations are naturally orthogonal. This benefit allows the GW 38 to know the exact location of ISU 40 for purposes of basic service determination near borders, and sending of emergency services, etc.

The foregoing discussion discloses and describes exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A method of optimizing a satellite communication system, including a constellation of medium-earth orbit (MEO) satellites, a constellation of low-earth orbit (LEO) satellites, a gateway, and an individual subscriber unit, comprising:

initiating a communication session between said individual subscriber unit and said communication system:

executing a decision algorithm to determine which of said constellation of MEO satellites and said constellation of LEO satellites will provide optimal communication service to said individual subscriber unit, wherein said optimal communication service is determined as a function of data rate and link margin; and establishing the communications session using the optimal communications service.

2. The method of claim 1, wherein said decision algorithm is executed by said gateway.

3. The method of claim 1, wherein said decision algorithm is executed by said individual subscriber unit.

4. The method of claim 1, wherein said decision algorithm is executed between said MEO and LEO satellite constellations.

5. The method of claim 1, wherein quality of service to said subscriber unit is monitored during communications.

6. The method of claim 5, wherein a switch-over occurs between said MEO and LEO satellites if said quality of service to said subscriber unit deteriorates.

7. The method of claim 1 further including monitoring control channels broadcasted by the MEO satellite constellation and the LEO constellation via the individual subscriber unit.

8. The method of claim 1 wherein the decision algorithm requests communication services from a LEO satellite within the LEO satellite constellation if a higher data rate communication service is needed by the individual subscriber unit.

9. The method of claim 1 wherein the decision algorithm requests communication services from a LEO satellite within the LEO satellite constellation If an unsatisfactory link margin is measured from a MEO satellite within the MEO satellite constellation.

10. The method of claim 1 wherein the decision algorithm requests communication services from a LEO satellite within the LEO satellite constellation if a lower communication delay is needed by the individual subscriber unit.

11. A satellite based communication system comprising:

a medium-earth orbit (MEO) satellite constellation having a plurality of MEO satellites capable of communicating with substantially all earth surfaces;

a low-earth orbit (LEO) satellite overlay constellation having a plurality of LEO satellites for providing at least partial earth coverage below the MEO satellite constellation;

an individual subscriber unit for communicating with at least one of the MEO satellite constellation and the LEO satellite constellation; and a decision algorithm for determining whether the MEO satellite constellation or the LEO satellite constellation provides optimal communication service to the individual subscriber unit, wherein said optimal communication service is determined as a function of data rate and link margin.

12. The communication system of claim 11 further including a terrestrial based gateway for communicating with the MEO satellite constellation and the LEO satellite constellation, the gateway executing the decision algorithm In response to control channel signal information received from the individual subscriber unit.

13. The communication system of claim 11 wherein the individual subscriber unit executes the decision algorithm in response to maintenance burst signals received from at least one of the MEO satellite constellation and the LEO satellite constellation.

14. The communication system of claim 11 wherein at least one of the MEO satellite and the LEO satellite executes the decision algorithm in response to uplink acquisition information received from the individual subscriber unit.

15. The communication system of claim 11 wherein the decision algorithm requests communication services from the LEO satellite within the LEO satellite constellation if a higher data rate communication service is needed by the Individual subscriber unit.

16. The communication system of claim 11 wherein the decision algorithm requests communication services from the LEO satellite within the LEO satellite constellation if an unsatisfactory link margin is measured from the MEO satellite within the MEO satellite constellation.

17. The communication system of claim 11 wherein the decision algorithm requests communication services from the LEO satellite within the LEO satellite constellation if a lower communication delay Is needed by the individual subscriber unit.

18. The communication system of claim 11 wherein the decision algorithm includes a geolocation functionality that provides accurate knowledge of the location of the individual subscriber unit thereby supporting basic emergency services.

* * * * *